(12) United States Patent
Ide

(10) Patent No.: US 11,623,466 B2
(45) Date of Patent: Apr. 11, 2023

(54) DISPLAY MEDIUM PROVIDED WITH DIFFRACTION STRUCTURE AND LIGHT CONTROL ELEMENT

(71) Applicant: TOPPAN PRINTING CO., LTD., Tokyo (JP)

(72) Inventor: Hidetaka Ide, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 217 days.

(21) Appl. No.: 17/118,838

(22) Filed: Dec. 11, 2020

(65) Prior Publication Data

US 2021/0094338 A1   Apr. 1, 2021

Related U.S. Application Data

(63) Continuation of application No. 15/653,802, filed on Jul. 19, 2017, now abandoned, which is a continuation of application No. PCT/JP2016/000259, filed on Jan. 19, 2016.

(30) Foreign Application Priority Data

Jan. 20, 2015   (JP) .................................. 2015-008667

(51) Int. Cl.
  *G02B 5/18*   (2006.01)
  *B42D 25/328*   (2014.01)
  *G09F 19/12*   (2006.01)

(52) U.S. Cl.
  CPC ............. *B42D 25/328* (2014.10); *G02B 5/18* (2013.01); *G09F 19/12* (2013.01)

(58) Field of Classification Search
  CPC ...... B42D 25/328; G02B 5/18; G02B 6/0035; G09F 19/12; G02F 1/157; G02F 2201/305; G06K 19/08

USPC .................................................. 359/2; 345/8
See application file for complete search history.

(56) References Cited

U.S. PATENT DOCUMENTS

| | | | |
|---|---|---|---|
| 8,174,489 B2 | 5/2012 | Sorensson et al. | |
| 8,387,886 B2 | 3/2013 | Tompkin et al. | |
| 2007/0076288 A1 | 4/2007 | Yoshimura et al. | |
| 2008/0259416 A1* | 10/2008 | Peters | G06K 19/08 359/2 |
| 2011/0292487 A1 | 12/2011 | Noh et al. | |
| 2012/0050140 A1* | 3/2012 | Border | G02B 6/0035 345/8 |
| 2016/0026060 A1 | 1/2016 | Koo et al. | |

FOREIGN PATENT DOCUMENTS

| | | |
|---|---|---|
| JP | S61-190369 A | 8/1986 |
| JP | H01-054709 B2 | 11/1989 |

(Continued)

OTHER PUBLICATIONS

International Search Report for International Patent Application No. PCT/JP2016/000259 dated Apr. 19, 2016.

(Continued)

*Primary Examiner* — Audrey Y Chang
(74) *Attorney, Agent, or Firm* — Foley & Lardner LLP

(57) ABSTRACT

A display medium that is able to arbitrarily change the display of recorded optical image information even when viewed from the same field of view, and an image display method that uses that display medium. The display medium includes a diffraction structure section on which optical image information is recorded, a chromic device that controls the reflection and transmission using voltage, and a power supply that is connected to the chromic device.

8 Claims, 16 Drawing Sheets

(56) References Cited

FOREIGN PATENT DOCUMENTS

| JP | H10-197904 A | 7/1998 |
| JP | 2002-228821 A | 8/2002 |
| JP | 2004-102840 A | 4/2004 |
| JP | 2010-524070 A | 7/2010 |
| JP | 2011-134048 A | 7/2011 |
| JP | 2014-112183 A | 6/2014 |
| KR | 2012-2290353 A | 8/2012 |

OTHER PUBLICATIONS

Araki et al. (2012), "Electrochemical optical-modulation device with reversible transformation between transparent, mirror, and black", Adv. Mater. 2012, 24, OP122-OP126.
Extended European Search Report dated Aug. 20, 2018 in corresponding application No. 16739945.
Notten, P.H.L., "Optical Switching or Y-Hydride Thin Film Electrodes," Journal of the Electrochemical Society, vol. 143, No. 10, Oct. 1996, pp. 3348-3353.
Richardson et al., "Mixed Metal Films with Switchable Optical Properties," Applied Physics Letters, vol. 8, No. 8, Feb. 25, 2002, pp. 1349-1351.
Tajima et al., "Surface Coating of Electrochomic Switchable Mirror Glass Based on Mg—Ni Thin Film for High Durability in the Environment," Applied Physics Express, vol. 3, 2010, pp. 042201-1-042201-3.
Richardson et al., "Switchable Mirrors Based on Nickel-Magnesium Films," Applied Physics Letters, vol. 78, Issue 20, 2001.

\* cited by examiner

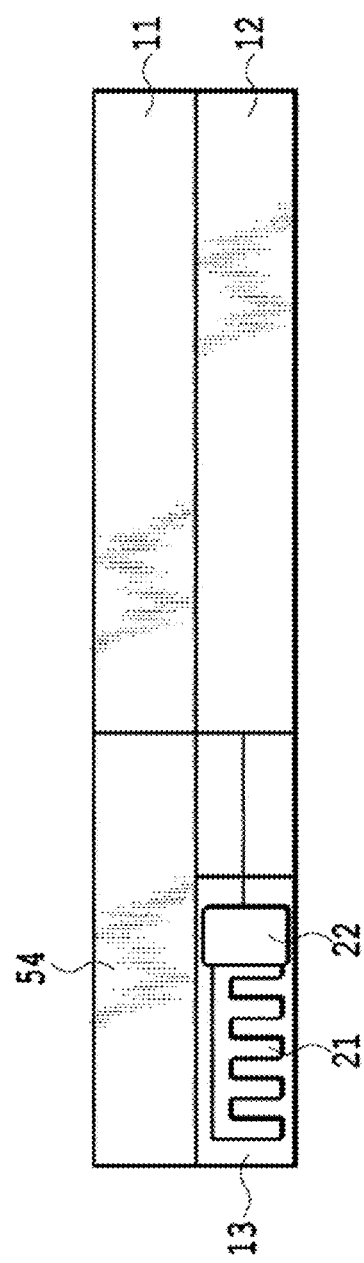

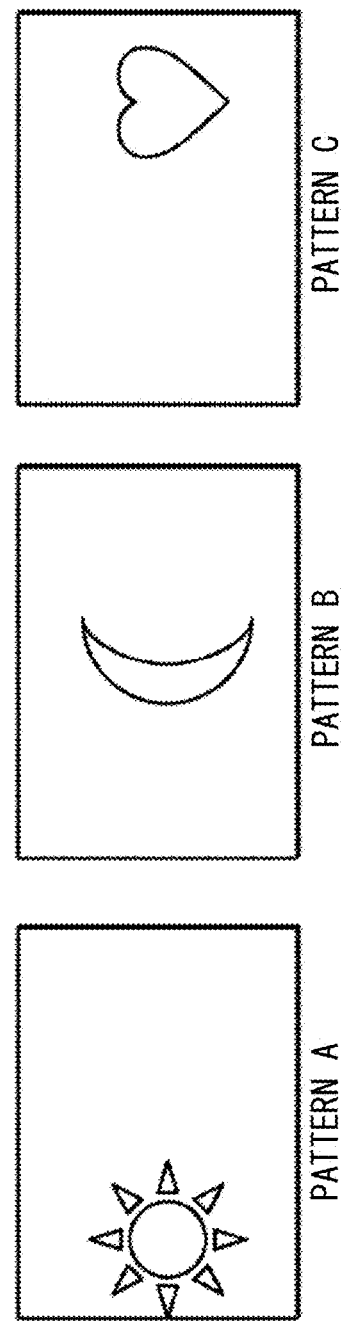

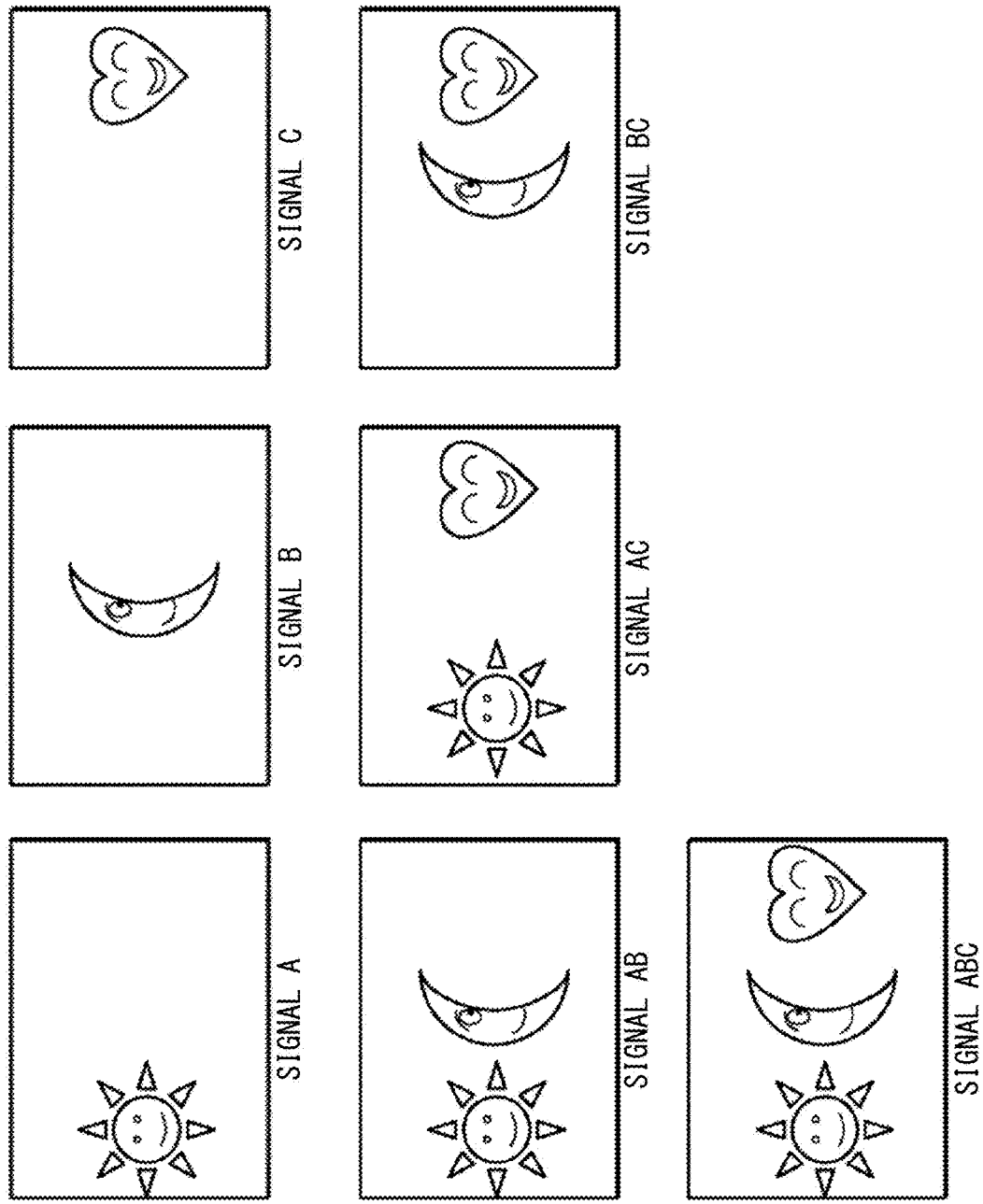

DISPLAY MEDIUM PROVIDED WITH DIFFRACTION STRUCTURE AND LIGHT CONTROL ELEMENT

CROSS-REFERENCE TO RELATED PATENT APPLICATIONS

The present application is a Continuation of U.S. patent application Ser. No. 15/653,802, filed on Jul. 19, 2017, which is a Bypass Continuation of International Patent Application No. PCT/JP2016/000259, filed on Jan. 19, 2016, which is based upon and claims the benefit of priority of Japanese Patent Application No. 2015-008667, filed on Jan. 20, 2015. The contents of these applications are hereby incorporated by reference in their entireties.

TECHNICAL FIELD

The present invention relates to a display medium that includes a diffraction structure section that records optical image information, a chromic device that controls light reflection and transmission using voltage, and a power supply that supplies voltage to the chromic device, and also relates to an image display method that uses that display medium.

BACKGROUND

In recent years, it is possible to easily determine authenticity at a glance by attaching a diffraction structure on which a diffraction grating pattern is recorded to an article (a counterfeit prevention article). In addition to that, because the diffraction structure is easy to handle, such a diffraction structure is often used as counterfeit prevention means. As an article having a diffraction structure that is used as this kind of counterfeit prevention means, there is, for example, an article having a diffraction structure that includes a release layer that has releasability, a diffraction structure formation layer on which a diffraction grating is formed, a reflective layer with a metallic luster, and an adhesive layer that are layered in that order on a substrate, and formed into a transfer foil (for example, refer to PTL 1).

Moreover, as a transparent diffraction grating, there is a transparent diffraction grating that is located on a layer below a reflective layer by forming a transparent metal deposition film or a thin film of an inorganic compound onto a reflective layer, and there is a transparent diffraction grating through which visual observation is possible (for example, refer to PTL 2).

However, these conventional articles having a diffraction structure are such that a vapor deposition film with a metallic luster and a transparent metallic film are formed into a predetermined pattern, or are formed as a whole, and visual change in the diffraction structure is only a change in the pattern or color that has been recorded on the diffraction structure due to a change in the viewing angle. In other words, in order to obtain a diffracted light pattern that is an optical visual effect due to a diffraction structure, a reflective layer that comes in contact with the diffraction structure layer is layered over the entire surface or in a pattern in an arbitrary shape, so the transmission density and reflection density of the reflective layer are fixed and do not change. Furthermore, in a conventional reflective layer that is made using a thin transparent metal layer, visibility of an image and visibility of a diffracted light pattern due to printing that is located on a lower layer are in a trade-off relationship from the relationship of reflected light and transmitted light, so a compromise is necessary to achieve the visibility of both.

On the other hand, in recent years, in order to reduce energy consumption, the development of light controllable glass aimed at improving heat insulation by a light shielding effect is advancing. Light controllable glass can be achieved by forming a light controllable mirror element that includes a combination of thin film materials onto a glass surface so that optical characteristics can be arbitrarily controlled, and particularly, when all of the thin film materials can be formed as solids, it is possible to form the light controllable mirror element on not only glass, but also on a plastic film that is bendable (for example, refer to PTL 3, and NPL 1). Uses for these light controllable mirror elements are currently limited to window glass for automobiles and buildings, and electronic display devices such as liquid-crystal displays, and these elements have not been applied to other uses.

PRIOR ART LITERATURE

[Citation List]
[Patent Literature]
[PTL 1] JP-A-S61-190369
[PTL 2] JP-A-H01-054709
[PTL 3] JP-A-2014-112183
[Non Patent Literature]
[NPL 1] Adv. Mater. 2012, 24, OP122-OP126, S. Araki, et. al.

SUMMARY OF THE INVENTION

Technical Problem

Taking into consideration the above, an object of the present invention is to provide a display medium that can arbitrarily change a display of recorded optical image information even when observed from the same viewing point, and to provide an image display method that uses that display medium.

Solution to Problem

The display medium of the present invention includes:
a diffraction structure section on which optical image information is recorded;
a chromic device that controls reflection and transmission of light by using a voltage; and
a power supply that is connected to the chromic device.
In one aspect of the present invention, the display medium of the present invention includes:
a diffraction structure section on which a plurality of optical information is recorded;
a plurality of chromic devices; and
at least one power supply.
Furthermore, in another aspect of the present invention, the display medium of the present invention further includes a concealing layer that covers the power supply. Moreover, in another aspect of the present invention, the display medium of the present invention further includes a printed layer. In another aspect of the present invention, the display medium of the present invention includes an external signal receiver and a processing chip.
Furthermore, the present invention provides a method for displaying optical image information by a display medium which includes:

a diffraction structure section on which optical image information is recorded;

a chromic device; and a power supply that supplies electric power to the chromic device, wherein the display medium displays the optical image information that has been recorded on the diffraction structure section depending on change of a voltage from the power supply to the chromic device.

Moreover, one aspect of the present invention provides a method for displaying optical image information by a display medium which includes:

a diffraction structure section on which a plurality of optical image information is recorded;

a plurality of chromic devices; and at least one power supply that supplies power to the chromic devices, wherein the display medium displays the plurality of optical image information that has been recorded on the diffraction structure section depending on change of a voltage from the power supply to the chromic devices.

Another aspect of the present invention provides an image display method that uses a display medium which includes:

a diffraction structure section on which a plurality of optical image information is recorded;

a plurality of patterned chromic devices;

at least one power supply that supplies electric power to the chromic devices;

an external signal receiver; and a processing chip; the method comprising the steps of:

selecting a pattern of the plurality of patterned chromic devices;

transmitting a pattern signal for the pattern from outside of the display medium;

receiving the pattern signal and transmitting the signal to the processing chip by the external signal receiver;

processing the signal and controlling the voltage that is applied from the power supply to the chromic devices by the processing chip; and changing a pattern state according to the applied voltage by the chromic devices.

Furthermore, the present invention provides an article to which any one of the display mediums described above is affixed.

Advantageous Effects of the Invention

By including a diffraction structure section on which optical image information is recorded, a chromic device that controls reflection and transmission of light by using voltage, and a power supply that is connected to the chromic device, the present invention is able to provide a display medium that is able to arbitrarily change an image that can be viewed from the same viewing point by controlling the voltage from the power supply, and a display method that uses the display medium to display optical image information that has been recorded on the diffraction structure section according to change in the voltage from the power supply to the chromic device. More specifically, the transmission and reflection of light of the chromic device is controlled by using voltage, and when light is reflected (mirror state), the chromic device reflects light that passes through the diffraction structure section, and by that reflected light, is able to display optical image information that is recorded on the diffraction structure section.

In another aspect of the present invention, by providing a display medium that includes a diffraction structure section on which a plurality of optical image information is recorded, a plurality of chromic devices, and at least one power supply, and a display method whereby that display medium is used to display a plurality of optical image information that has been recorded on the diffraction structure section, the present invention provides a display medium that is able to arbitrarily change an image that can be viewed from the same viewing point with a plurality of patterns and provides a display method for that display medium.

Furthermore, in another aspect of the present invention, the display medium of the present invention includes a concealing layer, and the concealing layer conceals part of the components such as the antenna section and the like, which makes it possible to improve the design.

In another aspect of the present invention, by providing a printed layer, the display medium of the present invention, in addition to the display of optical image information of the diffraction structure section that is arbitrarily changed by controlling the voltage, is able to provide image information that improves design and functionality.

Moreover, in another aspect of the present invention, by including an external signal receiver and a processing chip, the external signal receiver receives an external signal that is transmitted in accordance with a desired display state and sends that signal to the processing chip, and the processing chip further processes the signal and controls the voltage that is sent from the power supply to the chromic device, by which the display medium of the present invention is able to display a desired image.

Furthermore, in one aspect of the present invention, an article is provided to which the display medium of the present invention is affixed, and for example can be used in fields such as verification, anti-counterfeiting, decorations, toys, learning materials and the like, but however, is not limited to these.

BRIEF DESCRIPTION OF THE DRAWINGS

FIG. 11 illustrates a display medium 10 of the present invention that further includes a concealing layer 54, and in which the power supply 13 is an antenna section.

FIG. 17 illustrates three patterns of a chromic device of the display medium 10 of Example 3.

FIG. 18 illustrates the appearance of a picture when the display medium 10 of Example 3 receives an external signal related to the state of the chromic device 12.

DESCRIPTION OF REPRESENTATIVE EMBODIMENTS

In the following, preferred embodiments of the present invention will be explained in detail with reference to the drawings. The embodiments that will be described below are only examples of the present invention, and the design thereof could be appropriately changed by one skilled in the art. The embodiments described below are representative of the present invention and the invention is not limited thereto.

Figure 1:
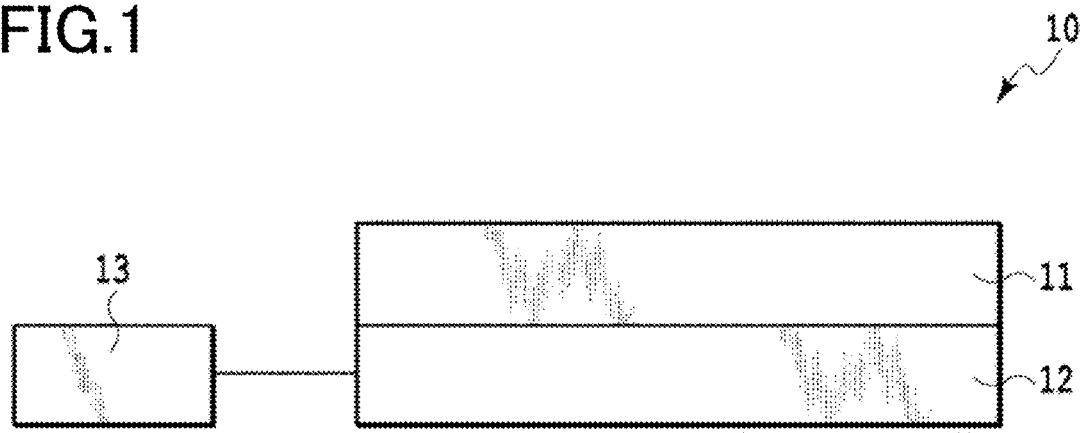
FIG. 1 is a schematic diagram illustrating the configuration of an embodiment of a display medium 10 of the present invention.

FIG. 1 is a schematic diagram illustrating the configuration of an embodiment of a display medium 10 of the present invention. The display medium 10 includes a diffraction structure section 11, a chromic device 12 and a power supply 13.

(Diffraction Structure Section)

The diffraction structure section 11 of the present invention, in the presence of a chromic device 12b that is in a mirror state as will be described later, generates diffracted light by light entering the diffraction structure section on which optical image information is recorded, and the diffracted light displays an image capable of stereoscopic viewing in 2D or 3D. The optical image information that is recorded on the diffraction structure section 11 may be singular or plural. When there is a plurality of recorded optical image information, the display medium of the present invention can arbitrarily change the image that can be visually recognized during observation from the same viewing point according to control by the chromic device 12 described later.

In the present invention, the "optical image information" is image information that is displayed by diffracted light that is generated by light entering the diffraction structure section 11, and is capable of being viewed in 2D or 3D. More specifically, the optical image information includes visually recognizable patterns that include pictures, characters, and changes in color.

In the present invention, the term "image" refers to information that can be visually recognized, and in addition to pictorial images such as illustrations and the like, includes characters, patterns, colors and shapes. Furthermore, images in the present invention are not limited to images that are displayed by diffracted light as described above, and includes images that are formed on a printed layer that will be described later, and the color of each component.

The diffraction structure section 11 of the present invention can be formed using materials and formation method that are known in the art.

As a material for forming the diffraction structure section 11 of the present invention it is possible to use a thermoplastic resin, a thermosetting resin, an ultraviolet light or electron beam curable resin and the like. For example, in the case of a thermoplastic resin, it is possible to use an acrylic resin, an epoxy resin, a cellulose resin, a vinyl resin and the like. It is also possible to use a urethane resin, a melamine resin, a phenol type resin and the like to which polyisocyanate is added and crosslinked as a crosslinking agent with acrylic polyol, polyester polyol or the like having a reactive hydroxyl group. Moreover, as ultraviolet light or electron beam curable resin, it is possible to use epoxy (meth)acrylate, urethane(meth)acrylate, and the like. Using these materials as the main material, the diffraction structure section 11 can be formed by a known coating method such as a gravure printing method, micro gravure method or the like.

As the recording method for recording optical image information to the diffraction structure section 11, it is also possible to use a method that is well known in the art. For example, although not being limited to these, the optical image information can be such that a diffraction structure 20 that is a minutely uneven structure is included in the diffraction structure section 11, also diffracted light of an image that is obtained by light with good coherence that is recorded on a photosensitive material may be incorporated in the diffraction structure section 11.

When the optical image information is recorded using a diffraction structure 20, the diffraction structure 20 is a minutely uneven structure, and in order to form this minutely uneven structure, a relief plate is used. The relief plate is made by a master plate by irradiating an electron beam onto the surface of electron beam curable resin to expose the surface with a desired pattern at first making, and after that, developing that pattern, then the relief plate is copying from the uneven pattern of the master plate onto the relief plate by forming a metal layer on the surface of the master plate using an electroplating method. A diffraction structure 20 having a minutely uneven structure is then formed by thermally pressing with contact the relief plate to the diffraction structure section 11, or by curing uncured curable resin while contact the relief plate to the resin.

(Chromic Device)

The chromic device 12 of the present invention can control transmittance and reflectance of light of the display medium 10 by switch between a transparent state (12*a*) and a mirror state (12*b*). Therefore, the control method is not limited as long as it is possible to use voltage to switch between a mirror state and a transparent state, and for example, it is possible to use an electrochromic type that performs switching electrically, or a gas chromic type that performs switching by the surrounding gas. From the aspect of convenience and safety, an electrochromic type is preferred, and an all solid electrochromic type light controlling mirror having a surface that is entirely solid instead of a fluid or gas is especially preferred.

For an electrochromic type light controlling mirror it is possible to use a structure that is known in the art, for example, it is possible to use a mirror in which a sealing layer, a light controlling mirror layer, a conductive layer and a sealing layer are layered in that order. Preferably, a light controlling mirror in which a light controlling mirror layer, catalyst layer, electrolyte layer, ion storage layer and a conductive layer are layered in that order, or a light controlling mirror in which a light controlling mirror layer, a catalyst layer, a buffer layer, an electrolyte layer, an ion storage layer and a conductive layer are layered in that order can be used.

As material for a gas chromatic type and electrochromic type light controlling mirror layer, a rare earth metal such as yttrium, lanthanum and the like, an alloy of a rare earth metal hydride and magnesium, an alloy of magnesium and a transition metal, an alloy of magnesium and nickel, and the like are known, and as the light control element in an electrochromic type light controlling mirror, an alloy of magnesium and nickel can be preferably used.

Moreover, as the catalyst layer material, it is possible to use palladium, platinum and the like; as the electrolyte layer material it is possible to use tantalum oxide, zirconium oxide and the like; as the ion storage layer material it is possible to use tungsten oxide and the like; and as the transparent conductive film, it is possible to use indium oxide, tin oxide, zinc oxide and the like. Furthermore, for all of the thin films it is possible to use a known method such as a vacuum deposition method, sputtering method or the like in order to obtain a desired thickness; however, the layer configuration, materials and manufacturing methods are not particularly limited to these.

The chromic device 12 of the present invention, in an embodiment of the present invention, may be adjacent to the diffraction structure section 11, and as long as the transmission of light is not impaired, a transparent layer (not illustrated in the figures) such as an adhesive layer may be optionally inserted between the chromic device 12 and the diffraction structure section 11. Moreover, as will be described later, a printed layer 55 may also be incorporated.

In the chromic device 12 of the present invention, the entire chromic device 12 may be controlled by a single external voltage. Alternatively, the chromic device 12 of the present invention may be composed of a plurality of patterned portions, and controlled by a plurality of external electric voltages.

(Power Supply)

The power supply 13 of the present invention is connected to the chromic device 12, and as the voltage changes, is able to control the mirror state and transparent state of the chromic device 12.

As long as the power supply 13 is able to provide sufficient electrical power in order to change the transmission state of light of the chromic device 12, it is possible to use a terminal for connecting to external power source, an antenna section that is able to generate alternating current from external electromagnetic waves, a solar battery, a paper battery and the like.

Figure 2A:
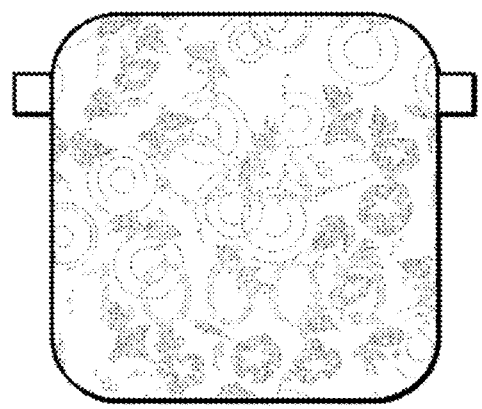
FIG. 2A is a plan view of the display medium 10 of the present invention when the chromic device 12 is in a transparent state (12*a*).
Figure 2B:
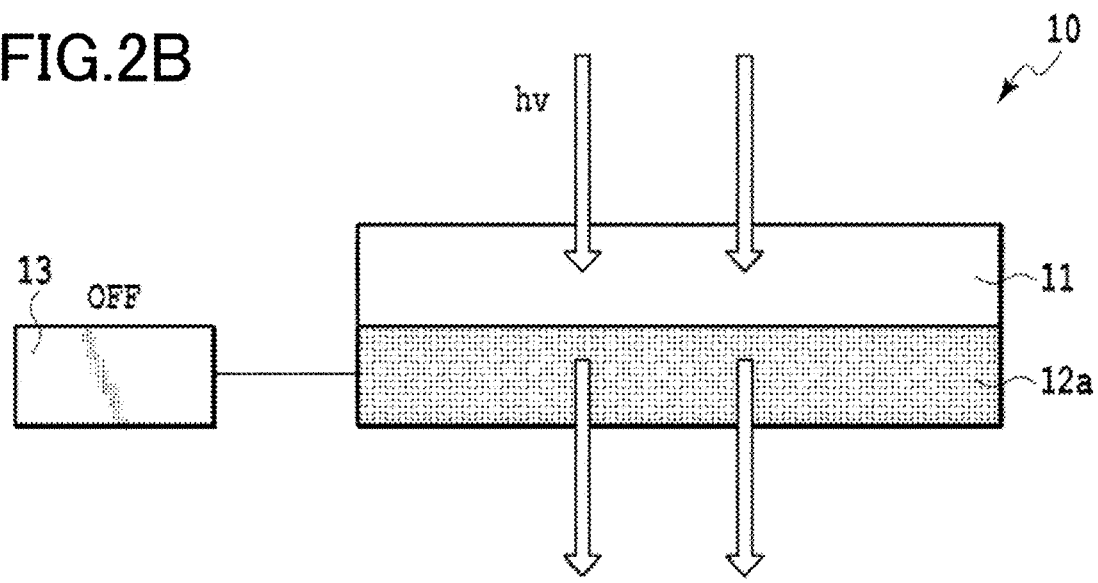
FIG. 2B is a schematic diagram illustrating the display medium 10 of the present invention when the chromic device 12 is in a transparent state (12*a*).

When voltage is not applied to the chromic device 12 from the power supply 13, the chromic device 12 is in the transparent state (12*a*) and transmits light (refer to FIG. 2A and FIG. 2B). However, when voltage is applied to the chromic device 12 from the power supply 13, the chromic device 12 is in the mirror state (12*b*), and reflects light that passes through the diffraction structure section 11, and that reflected light displays the optical image information that is recorded on the diffraction structure section 11 (refer to FIG. 3A and FIG. 3B).

Figure 4A:
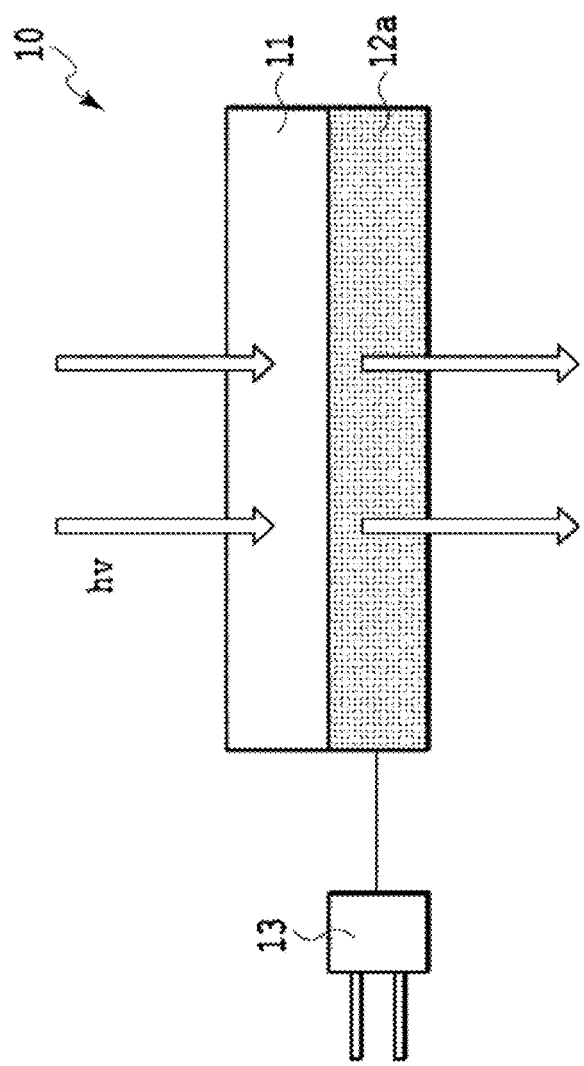
FIG. 4A is a schematic diagram illustrating the display medium 10 of the present invention when a power supply 13 is provided as a terminal for connecting to external power source.
Figure 4B:
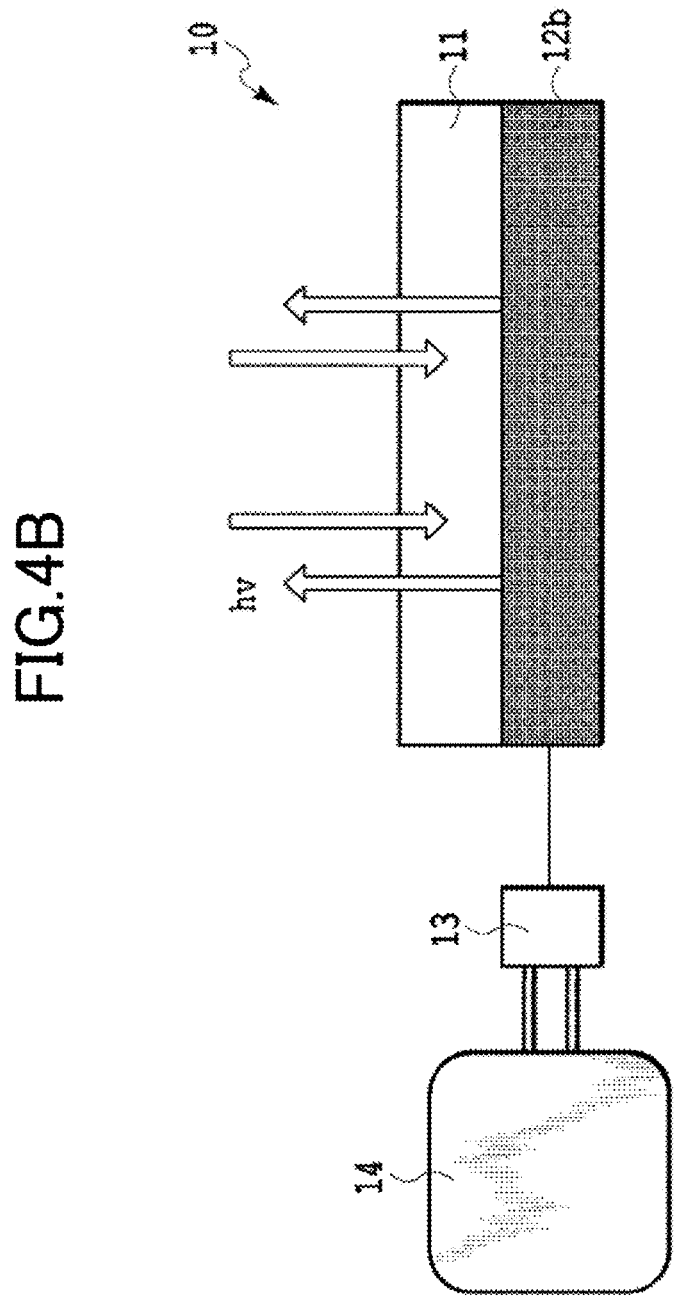
FIG. 4B is a schematic diagram illustrating the display medium 10 of the present invention when the power supply 13 is provided as a terminal for connecting to external power source, and is connected to external power source 14.

When the power supply 13 is a terminal for connecting to external power source 14 (FIG. 4A), voltage is applied to the chromic device 12 when the external power source 14 is connected to the terminal of the power supply 13 that is connected to the chromic device 12, and an image is displayed on the diffraction structure section 11 (FIG. 4B).

Figure 5:
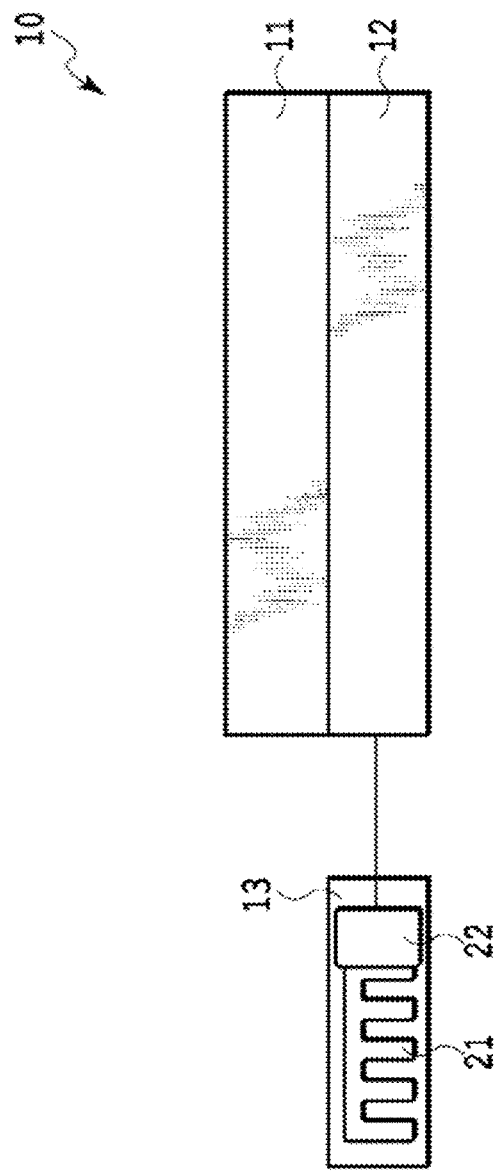
FIG. 5 is a schematic diagram illustrating the display medium 10 of the present invention when the supply section 13 is an antenna section.

Moreover, when the power supply 13 is an antenna section, it is possible to display an image of the diffraction structure section 11 on the display medium 10 of the present invention by applying a voltage to the chromic device 12 by bringing the power supply 13 close to a device that emits electromagnetic waves or a magnetic flux even when in a non-contact state. The antenna section includes an antenna 21 that is designed to generate an alternating current by receiving an external electromagnetic waves or a magnetic flux, and an IC chip 22 for rectifying and converting the alternating current that is generated by the antenna 21 to a direct current, and further for constant the generated voltage (refer to FIG. 5).

As the material for the antenna 21, it is possible to use a known conductive metal material such as copper, silver, aluminum and the like; and the IC chip 22 should serve to rectify and generate a constant voltage, and should be of a thin and compact type.

As the method for manufacturing the antenna section, the antenna section 21 is manufactured, for example, by forming a layer made using a resin material as an antenna base layer in advance, then forming a thin metal film on that resin layer, and coating a masking agent in the desired shape of an antenna on that thin metal film and drying the masking agent, then dissolving and removing the unnecessary thin metal film using an etching method, and finally removing the masking agent to finishing manufacturing the antenna section 21, then connecting and fastened to the IC chip 22 to that.

Furthermore, as another method, the antenna 21 may be manufactured by mounting the chromic device 12 and IC chip 22 in a connected state on a resin layer in advance, then coating an conductive ink that includes conductive metal particles so as to connect to another terminal of the IC chip 22 by a screen printing method, gravure printing method or the like.

Furthermore, in an embodiment of the present invention, the power supply 13 of the present invention may provide one set of terminals for the chromic device 12, and may also include plural terminals that correspond to the chromic device 12 that includes plural patterned portions.

Figure 6:
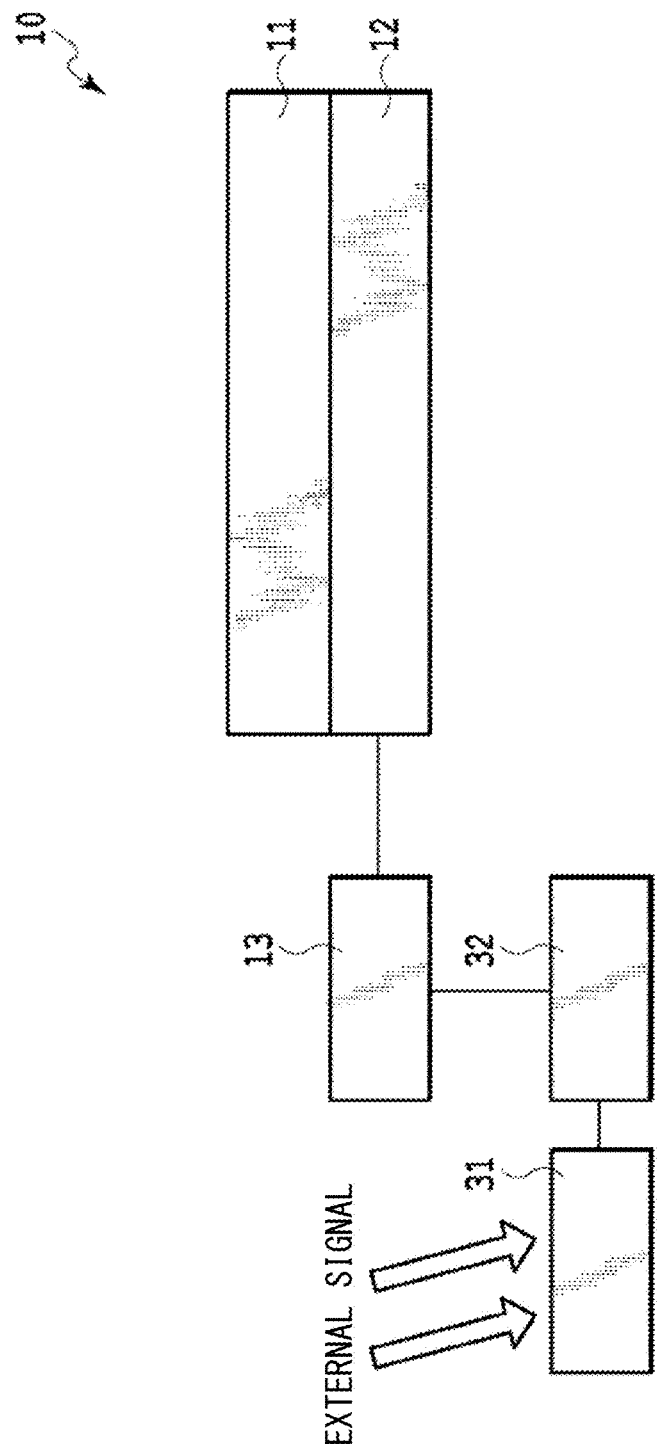
FIG. 6 is a schematic diagram illustrating a structure in which the display medium 10 of the present invention further has an external signal receiver 31 for receiving external signals, and a processing chip 32 for processing the external signals.
Figure 7:
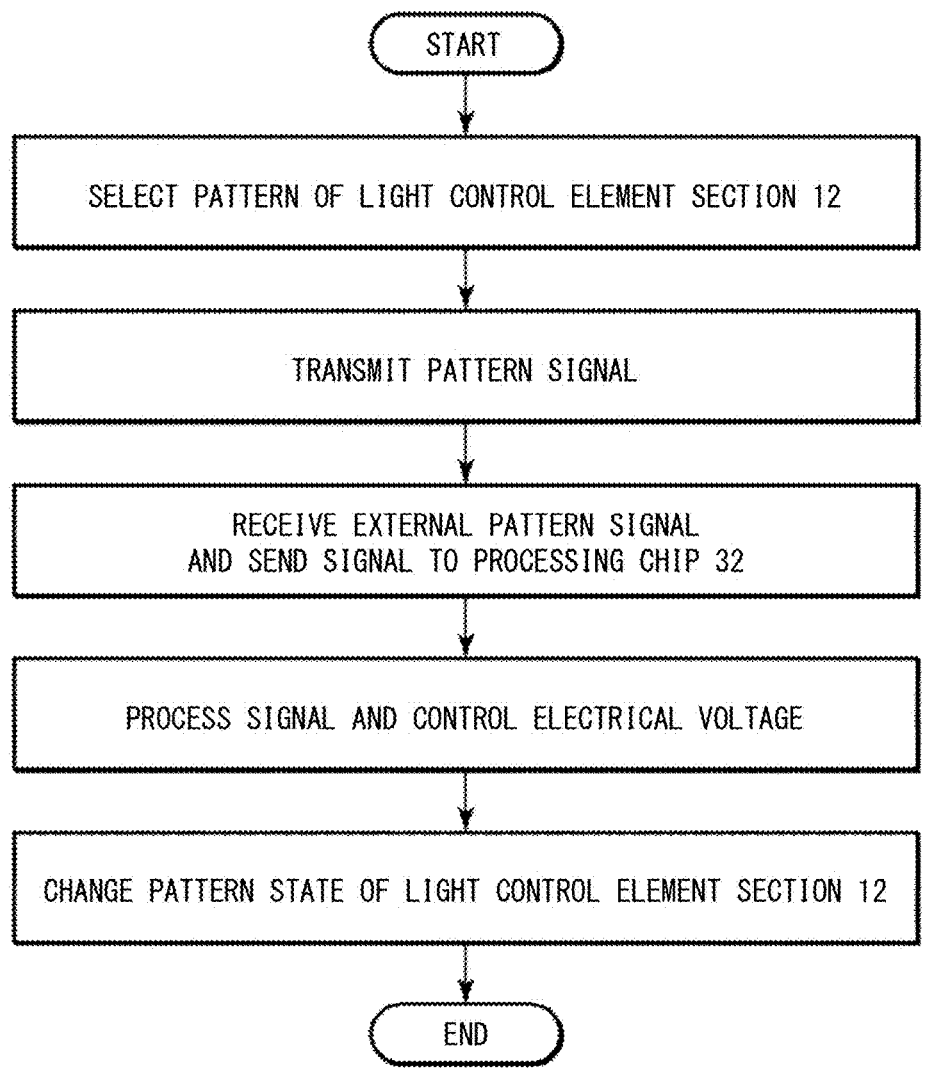
FIG. 7 is a flowchart illustrating the control flow when the display medium 10 of the present invention having plural chromic devices 12 changes the pattern state of the chromic devices by an external signal.

When the power supply 13 includes plural terminals, the display medium 10 of the present invention may further include an external signal receiver 31 that receives external signals that control the power supply to these terminals that correspond to display state, and a processing chip 32 that processes the received signals (refer to FIG. 6). On this kind of configuration, as illustrated in FIG. 7, it is selecting a pattern of chromic device 12 from plural patterns which has been patterned (P1), and transmitting a pattern signal for that pattern from outside of the display medium 10 (P2). Next, the external signal receiver 31 of the display medium 10 receives that pattern signal, and sends the signal to the processing chip 32 (P3), the processing chip 32 then processes the signal and controls the voltage that is applied to the chromic device 12 from the power supply 13 (P4), and according to the applied voltage, the chromic device 12 can change the pattern state (P5).

In an embodiment of the present invention, the pattern signal (P2) may be encrypted. For example, when the transmitted pattern signal (P2) is a predefined and correct one, the processing chip 32 processes the signal from the external signal receiver 31, then the corresponding voltage is provided to the chromic device 12, and optical image information that is recorded on the diffraction structure section 11 and/or an image described in the printed layer 55 described later, are displayed. Conversely, when the pattern signal (P2) is incorrect, the processing chip 32 is able to not change the display, or is able to display information other than the correct optical image information that is normally supposed to be displayed. Furthermore, in that case, chromic device 12 may be singular or include plural portions which has been patterned.

As a result, it is possible to prevent displayed optical image information that is recorded on the diffraction structure element 11 and/or an image that is on the printed layer 55, and to prevent read by a person that does not know the code which recorded optical image information. Preventing this kind of improper reading is a preferable implement of a display body when sending information to a particular person, such as personal information that is to be concealed.

Figure 8A:
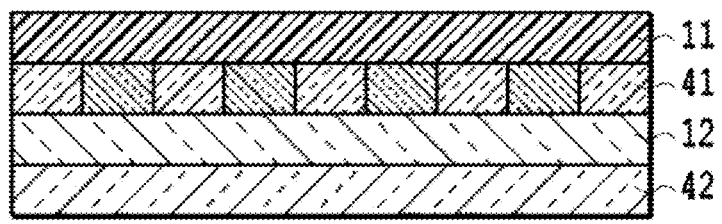
FIG. 8A is a cross-sectional view illustrating an embodiment of the present invention having a structure in which an electrode that applies voltage to the chromic device 12 is formed in a matrix shape.
Figure 8B:
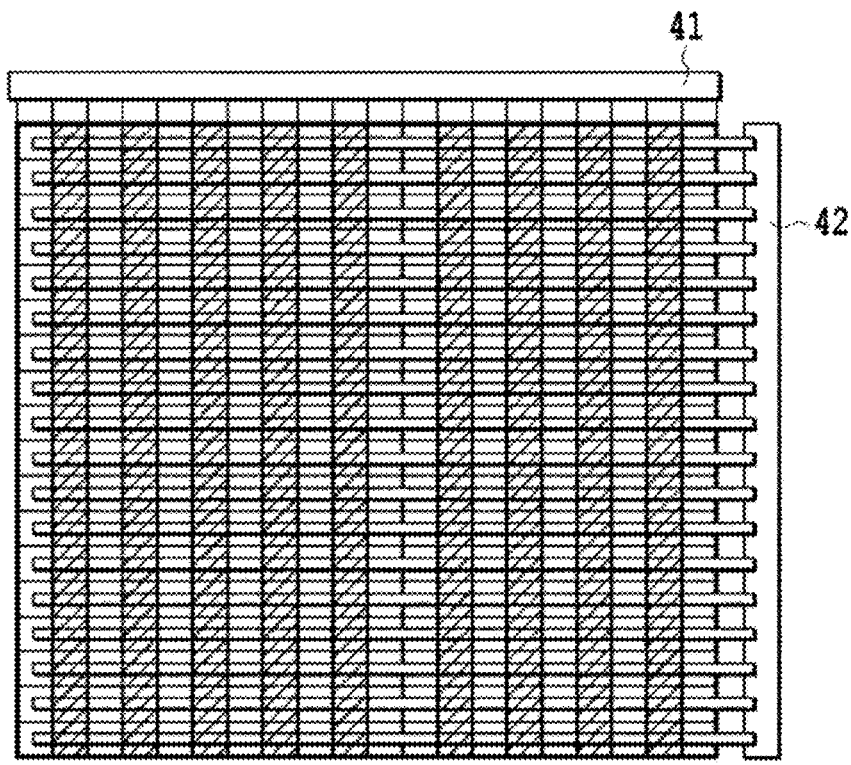
FIG. 8B is a plan view illustrating an embodiment of the present invention having a structure in which an electrode that applies voltage to the chromic device 12 is formed in a matrix shape.

FIGS. 8A and 8B are a cross-sectional view (FIG. 8A) and a plan view (FIG. 8B) that illustrate an embodiment of the present invention that has a structure in which the electrode that applies a voltage to the chromic device 12 is formed into a matrix shape. In this example, the top-layer electrode 41 also has the function of the chromic device 12, and covers most of the entire surface in a line shape. However, the bottom-layer electrode 42 that is a transparent conductive film is arranged in a line shape in a direction different from the top-layer electrode 41, and as a result, these electrodes are formed in a matrix shape. Although not illustrated in the figures, it is possible to arbitrarily control the transparent state and mirror state of each matrix in a line shape by control by the processing chip 32. In another embodiment of the present invention, by refining this matrix and including an individual ON/OFF control element for each matrix, it is possible to form an arbitrary high definition pattern that includes mirror states and transparent states.

(Other Component Elements)

The display medium 10 of the present invention may also include arbitrary component elements as long as the configuration and functions described above are not hindered. For example, component elements that are described hereafter may be included, however it will be understood by one skilled in the art that the component elements are not limited to these.

(Adhesive Member)

Figure 9:
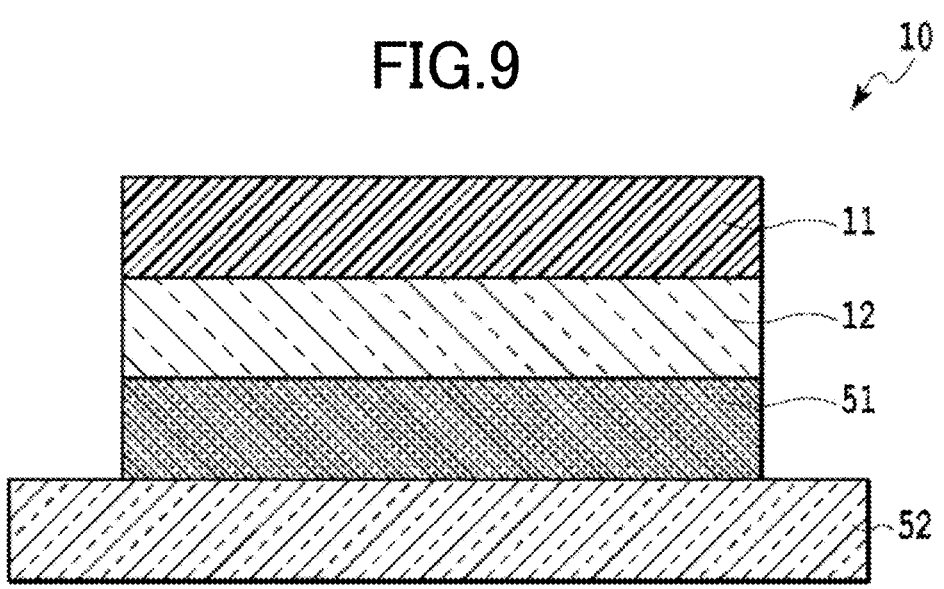
FIG. 9 is a cross-sectional view illustrating a display medium 10 of the present invention that further includes an adhesive layer 51 and a supporting body 52.
Figure 10:
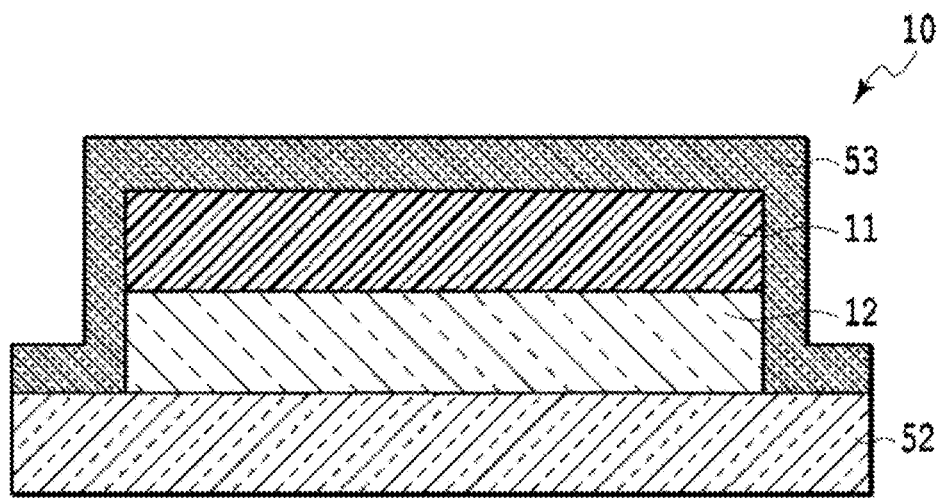
FIG. 10 is a cross-sectional view illustrating a display medium 10 of the present invention that further includes a cover member 53 and a supporting body 52.

The adhesive member is used for affixing the display medium 10 of the present invention to a substrate. The adhesive member may be formed as an adhesive layer 51 on the very bottom layer of the display medium 10 (refer to FIG. 9), and may also be an adhesive transparent cover member 53 that covers the display medium 10 and affixes the display medium to a substrate (refer to FIG. 10). A material that is known in the art may be used for the adhesive member, and depending on the article to which the adhesive member will be affixed, it is also possible to use a pressure sensitive type or heat sensitive type adhesive.

(Supporting Body)

When the display medium 10 of the present invention has an adhesive member as described above, the supporting body 52 may be used as a release paper or release film that protects the adhesive surface. As the material used for the supporting body 52 it is possible to use release paper formed by coating a high-quality paper, coated paper, non-woven fabric and the like with a release material, or it is possible to use a release film that is formed by making a film using vinyl chloride resin, polyester terephthalate resin (known as PET), polyethylene resin or the like, and providing a release layer on that film.

(Concealing Layer)

A concealing layer 54 is a layer with the purpose of improving the design by concealing the antenna 21 and IC chip 22 that are provided in the antenna section (refer to FIG. 11), and a known material can be used as long as it is possible to achieve both adhesiveness to another layer such as the antenna section and the like that comes in contact with the concealing layer 54 and concealment. For example, it is possible to use commercially available white printing ink, silver concealing ink and the like.

(Printed Layer)

Figure 12A:
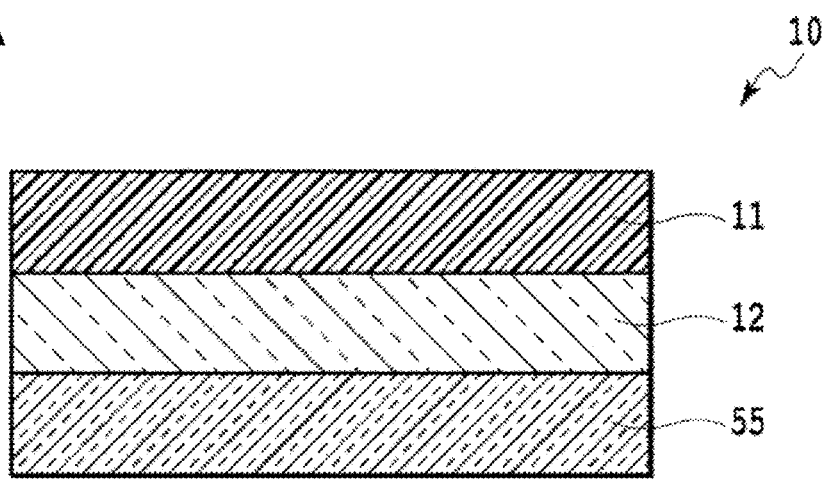
FIG. 12A is a cross-sectional view illustrating the display medium 10 of the present invention including a printed layer 55 underneath the chromic device 12.
Figure 13A:
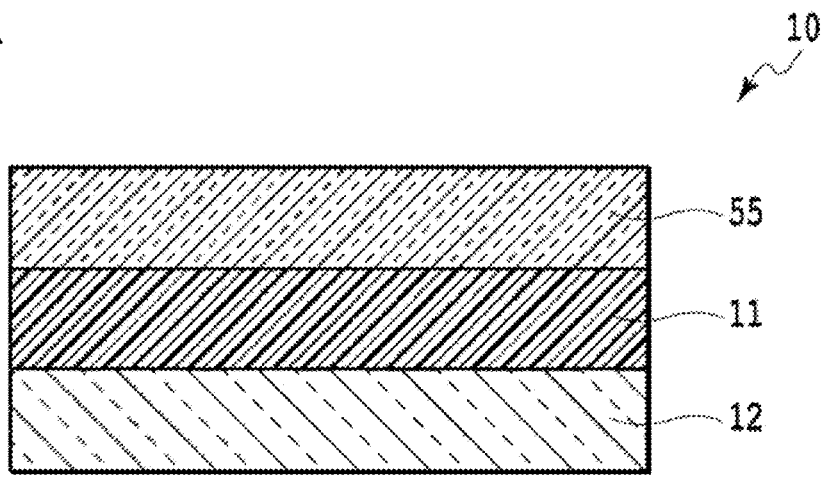
FIG. 13A is a cross-sectional view illustrating the display medium 10 of the present invention that includes a printed layer 55 above the diffraction structure section 11.
Figure 13B:
FIG. 13B is a plan view when the chromic device 12 of the display medium 10 of the present invention that includes a printed layer above a diffraction structure section 11 is in a transparent state.
Figure 13C:
FIG. 13C is a plan view when the chromic device 12 of the display medium 10 of the present invention that includes a printed layer above a diffraction structure section 11 is in a mirror state.
Figure 14:
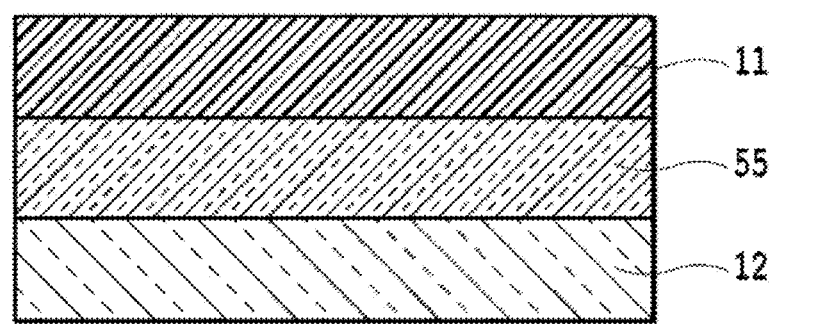
FIG. 14 is a cross-sectional view of the display medium 10 of the present invention that includes a printed layer 55 between the diffraction structure section 11 and the chromic device 12.

The printed layer 55 is a layer for visually recognizing shapes of characters, illustrations, patterns and the like. The printed layer 55, taking into consideration the decorativeness and/or functionality, may be formed in an arbitrary location of the display medium 10. The layered structure of the display medium 10 is illustrated in FIG. 12A, FIG. 13A and FIG. 14. These figures schematically illustrate the layered state of the present invention, and illustrate a printed layer 55 that is not formed over the entire surface. Taking into consideration light transmittance, the printed layer 55 may be formed so as to cover part of the diffraction structure section 11 and or chromic device 12.

Figure 12B:
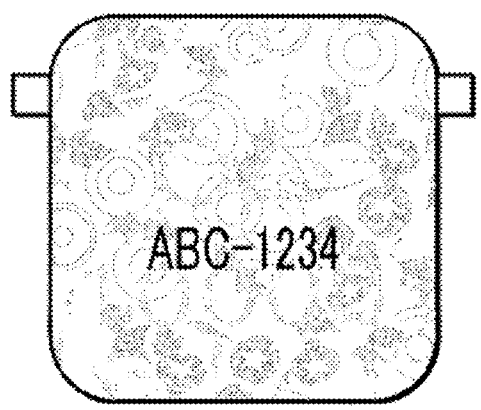
FIG. 12B is a plan view when the chromic device 12 of the display medium 10 of the present invention that includes a printed layer 55 underneath the chromic device 12 is in a transparent state.
Figure 12C:
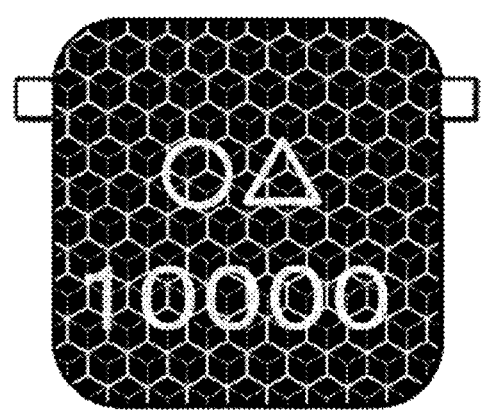
FIG. 12C is a plan view when the chromic device 12 of the display medium 10 of the present invention that includes a printed layer 55 underneath the chromic device 12 is in a mirror state.

For example, when formed on a layer underneath the chromic device 12, the pattern of the printed layer can be visually recognized in the transparent state (refer to FIG. 12B), however, is hidden in the mirror state, and a completely different appearance is provided (refer to FIG. 12C). Moreover, when formed above the diffraction structure section 11, or between the diffraction structure section 11 and the chromic device 12, the pattern and the like of the printed layer can be visually recognized regardless of the state of the chromic device 12 (refer to FIGS. 13A to 13C, and FIG. 14). When the printed layer 55 is formed above the diffraction structure section 11 or between the diffraction structure section 11 and the chromic device 12, preferably the printed layer 55 is formed using materials that will not interfere with light transmission. Moreover, the printed layer 55 may be directly depicted on the diffraction structure section 11 or chromic device 12 without using layer forming material.

For the printed layer it is possible to use a known material or commercially available ink that has good visual visibility, and has good adhesion with a layer that comes in direct contact with the chromic device 12, diffraction structure section 11 or the like, and in regard to the forming method, the printed layer 55 can be formed by a known printing method such as a relief printing method or gravure printing method, an offset printing method, a screen printing method and the like.

(Brittle Section)

A brittle section (not illustrated in the figures) is a portion that is easily damaged when physically or chemically peeling the display medium 10 of the present invention that is affixed to a substrate, making it impossible to replace the display medium 10. For example, by providing a portion having an extremely thin thickness on a portion of the resin layer of the display medium 10, partially providing a flexible resin layer having flexibility with high elasticity, or partially providing broken locations, it is possible to make at least part of the display medium 10 of the present invention physically brittle. Moreover, by forming at least one layer of the display medium 10 using a material that easily dissolves in an arbitrary organic solvent that does not dissolve the adhesive layer, it is possible to provide a layer that is easily damaged chemically.

The brittle section can be provided in any layer or portion of any embodiment of the present invention. For example, in the case of the display medium illustrated in FIG. 12A, a brittle section may be provided between the diffraction structure section 11 and the chromic device 12, or between the chromic device 12 and the printed layer 55. Moreover, a brittle section may be patterned so that a pattern occurs when the brittle section is damaged.

(Preferred Embodiments)

The display medium of the present invention includes embodiments that will be described later. By having this kind of structure, the display medium can be used for applications such as forgery prevention, decoration, toys, teaching materials and the like.

In an embodiment of the present invention, the display medium of the present invention includes a diffraction structure section, a chromic device and a power supply.

In an embodiment of the present invention, the display medium of the present invention includes a diffraction structure section, a chromic device that is an electrochromic-type light controlling mirror, and a power supply.

In an embodiment of the present invention, the display medium of the present invention includes a diffraction structure section, a chromic device, and a power supply that is a terminal for connecting to external power source. Moreover, in another embodiment of the present invention, the display medium of the present invention includes a diffraction structure section, a chromic device and a power supply that is an antenna section. Furthermore, in another embodiment of the present invention, the display medium of the present invention includes a diffraction structure section, a chromic device, and a power supply that is a solar battery. In another embodiment of the present invention, the display medium of the present invention includes a diffraction structure section, a chromic device and a power supply that is a paper battery.

In an embodiment of the present invention, the display medium of the present invention includes a diffraction structure section, a chromic device that is an electrochromic-type light controlling mirror, and a power supply that is a terminal for connecting to external power source. Moreover, in another embodiment of the present invention, the display medium of the present invention includes a diffraction structure section, a chromic device that is an electrochromic-type light controlling mirror, and a power supply that is an antenna section. Furthermore, in another embodiment of the present invention, the display medium of the present invention includes a diffraction structure section, a chromic device that is an electrochromic-type light controlling mirror, and a power supply that is a solar battery. In another embodiment of the present invention, the display medium of the present invention includes a diffraction structure section, a chromic device that is an electrochromic-type light controlling mirror, and a power supply that is a paper battery.

In an embodiment of the present invention, the display medium of the present invention includes plural diffraction structure sections, plural chromic devices, and plural power supplies. In another embodiment of the present invention, the display medium of the present invention includes plural diffraction structure sections, plural chromic devices for which patterns has been formed, and plural power supplies. Moreover, in another embodiment of the present invention, the display medium of the present invention includes plural diffraction structure sections, plural chromic devices for which patterns are formed in a matrix shape, and plural power supplies. Furthermore, in another embodiment of the present invention, the display medium of the present invention includes plural diffraction structure sections, plural chromic devices for which patterns are formed in a matrix shape, pattern signals for the state of a selected chromic device, an external signal receiver that receives a pattern signal, a processing chip that processes a received pattern signal, and a power supply that changes the voltage according to the signal from the processing chip.

In an embodiment of the present invention, the display medium of the present invention includes a diffraction structure section, a chromic device, a power supply and an adhesive member. In another embodiment of the present invention, the display medium includes a diffraction structure section, a chromic device, a power supply and an adhesive layer. Moreover, in another embodiment of the present invention, the display medium includes a diffraction structure section, a chromic device, a power supply and a cover member.

In an embodiment of the present invention, the display medium of the present invention includes a diffraction structure section, a chromic device, a power supply, an adhesive member and a supporting body. In another embodiment of the present invention, the display medium of the present invention includes a diffraction structure section, a chromic device, a power supply, an adhesive layer and a supporting body. Moreover, in another embodiment of the present invention, the display medium of the present invention includes a diffraction structure section, a chromic device, a power supply, a cover member and a supporting body.

In an embodiment of the present invention, the display medium of the present invention includes a diffraction structure section, a chromic device, a power supply and a concealing layer. In another embodiment of the present invention, the display medium of the present invention includes a diffraction structure section, a chromic device, a power supply that is an antenna section, and a concealing layer.

In an embodiment of the present invention, the display medium of the present invention includes a diffraction structure section, a chromic device, a power supply and a printed layer. In another embodiment of the present invention, the display medium of the present invention includes a diffraction structure section, a chromic device, a power supply and a printed layer that is formed on layer underneath the chromic device. Moreover, in another embodiment of the present invention, the display medium of the present invention includes a diffraction structure section, a chromic device, a power supply and a printed layer that is formed on a layer above the diffraction structure section. Furthermore, in another embodiment of the present invention, the display medium of the present invention includes a diffraction structure section, a chromic device, a power supply and a printed layer that is formed between the diffraction structure section and the chromic device.

In an embodiment of the present invention, the display medium of the present invention includes a diffraction structure section, a chromic device, a power supply, a printed layer and an adhesive member. In another embodiment of the present invention, the display medium of the present invention includes a diffraction structure section, a chromic device, a power supply, a printed layer and an adhesive layer. Moreover, in another embodiment of the present invention, the display medium of the present invention includes a diffraction structure section, a chromic device, a power supply, a printed layer and a cover member. Furthermore, in another embodiment of the present invention, the display medium of the present invention includes a diffraction structure section, a chromic device, a power supply, a printed layer, an adhesive member and a supporting body. In another embodiment of the present invention, the display medium of the present invention includes a diffraction structure section, a chromic device, a power supply, a printed layer, an adhesive layer and a supporting body. Moreover, in another embodiment of the present invention, the display medium of the present invention includes a diffraction structure section, a chromic device, a power supply, a printed layer, a cover member and a supporting body.

In an embodiment of the present invention, the display medium of the present invention includes a diffraction structure section, a chromic device, and a power supply, and one of the layers or portions is made to be brittle. In another embodiment of the present invention, the display medium of the present invention includes a diffraction structure section, a chromic device, and a power supply, and one of the layers or portions is physically made to be brittle. Moreover, in another embodiment of the present invention, the display medium of the present invention includes a diffraction structure section, a chromic device, and a power supply, and one of the layers or portions is chemically made to be brittle. Furthermore, in another embodiment of the present invention, the display medium of the present invention includes a diffraction structure section, a chromic device, and a power supply that is an antenna section, and the power supply is made to be brittle.

In an embodiment of the present invention, the display medium of the present invention is affixed to an article. In another embodiment of the present invention, an article is affixed to the display medium.

In an embodiment of the present invention, the present invention may be used for verification or for preventing counterfeiting. In another embodiment of the present invention, the present invention may be used for decoration. Moreover, in another embodiment of the present invention, the present invention may be used for toys. Furthermore, in another embodiment of the present invention, the present invention may be used for study materials.

EXAMPLES

In the following, the present invention and effects of the invention will be explained using detailed examples, however, the examples do not limit the applicable range of the present invention.

Example 1

As the supporting body for manufacturing, a 250 μm thick polyethylene terephthalate (PET) plate was used. One surface of this supporting body was coated with ink having the composition described below, and the ink was dried to form a 0.5 μm thick release layer.

[Release Layer Ink Composition]

| Polyamide imide resin | 19.5 parts by weight |
| Polyethylene powder | 0.5 parts by weight |
| Dimethylacetamide | 30.0 parts by weight |
| Toluene | 50.0 parts by weight |

Next, ink that includes the composition described below was coated and dried on the release layer using a gravure printing method, and after a 1.5 μm thick diffraction structure section was layered, a pre-fabricated relief plate for expressing a diffracted light pattern of a picture of a goldfish and morning glory (refer to FIG. 2A) was heated and pressed against the diffraction structure layer to form a desired diffraction section 11 on the diffraction structure layer.

[Ink Composition of the Diffraction Structure Layer]

| Acrylic resin | 18.0 parts per weight |
| Silane coupling agent | 2.0 parts per weight |
| Methyl ethyl ketone | 80.0 parts per weight |

Next, a 100 nm thickness film of an alloy of magnesium and nickel was formed on the diffraction structure section 11 using a sputtering method, and the light controlling mirror layer of the chromic device 12 was layered.

Next, water-soluble masking ink having the composition described below was coated and dried on the portion that will become the electrode of the light controlling mirror layer using a gravure printing method to form a first mask printed layer having a thickness of 5 μm, after which the catalyst layer of the chromic device 12 was layered by forming a 100 nm thickness film of palladium using a sputtering method.

[Composition of the Water-soluble Masking Ink]

| Water-soluble inorganic salt | 13.0 parts by weight |
| Hydrophilic inorganic filler | 2.0 parts by weight |
| Isopropyl alcohol | 10.0 parts by weight |
| Water | 75.0 parts by weight |

Next, the electrolyte layer of the chromic device 12 was layered by forming a 100 nm thickness film of tantalum oxide using a sputtering method.

The ion storage layer of the chromic device 12 was then layered by forming a 100 nm thickness film of tungsten oxide using a sputtering method.

Next, the conductive film layer of the chromic device 12 was layered by forming a 100 nm thickness film of a mixture of indium oxide and tin oxide (ITO) using a sputtering method. Then, a second mask printed layer having a thickness of 5 µm was formed on part of the conductive film layer that is different than the first mask printed layer by applying and drying a coat of ink having the same composition as the first mask printed layer on a portion that will become another electrode.

Next, a concealing layer 54 having a thickness of 2 µm was formed by applying and drying a coat of white concealing ink having the composition described below using a gravure printing method.

[Composition of the White Concealing Ink]

| | |
|---|---|
| Ink binder | 10.0 parts by weight |
| White pigment | 5.0 parts by weight |
| Titanium oxide | 20.0 parts by weight |
| Ethyl acetate | 65.0 parts by weight |

Next, and electrode was formed by exposing the catalyst layer and conductive layer by removing the first mask layer and second mask layer by washing with water. The IC chip 22 was then connected to this electrode, and furthermore, an antenna 21 having a desired antenna shape was formed by using a screen printing method to apply and dry a coat of ink for a printed antenna having the composition described below so that the end section of the antenna 21 is connected with the IC chip 22.

[Composition of Ink for a Printed Antenna]

| | |
|---|---|
| Silver | 80.0 parts by weight |
| Diethylene glycol monoethyl ether acetate | 20.0 parts by weight |

Figure 15:
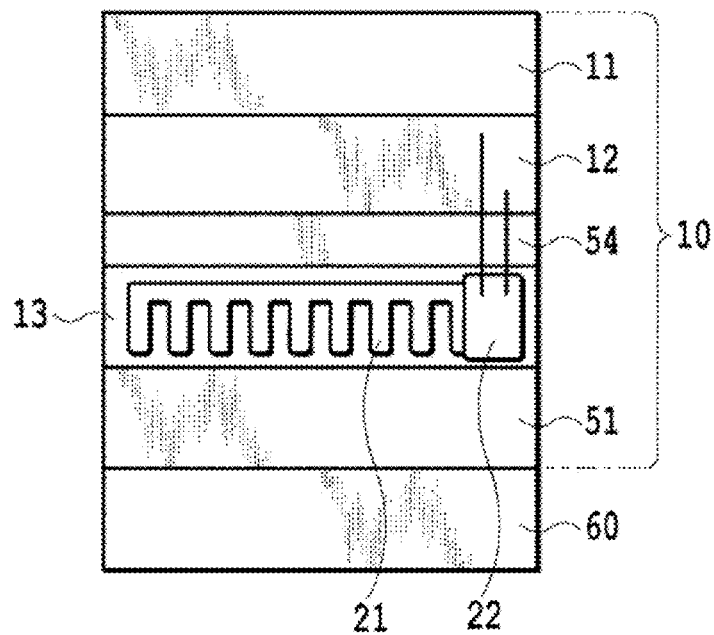
FIG. 15 illustrates the structure of the display medium 10 of Example 1.

Next, an adhesive layer 51 having a thickness of 5 µm was layered by using a gravure printing method to apply and dry a coat of adhesive layer ink having the composition described below so as to cover the entire surface of the diffraction structure section 11, antenna 21 and IC chip 22. Then, polyethylene was laminated to one surface of kraft paper (thickness of about 100 µm), and a silicon-treated separator was temporarily adhered to that adhesive layer. After that, the display medium 10 was made by peeling the separator away and affixing the laminated body to an article 60, and finally by peeling the laminated body away from the PET plate that is the supporting body for manufacturing (refer to FIG. 15).

[Composition of the Adhesive Layer Ink]

| | |
|---|---|
| Acrylic adhesive | 30.0 parts by weight |
| Ethyl acetate | 50.0 parts by weight |
| Toluene | 20.0 parts by weight |

Figure 3A:
FIG. 3A is a plan view illustrating the display medium 10 of the present invention when the chromic device 12 is in a mirror state (12*b*).
Figure 3B:
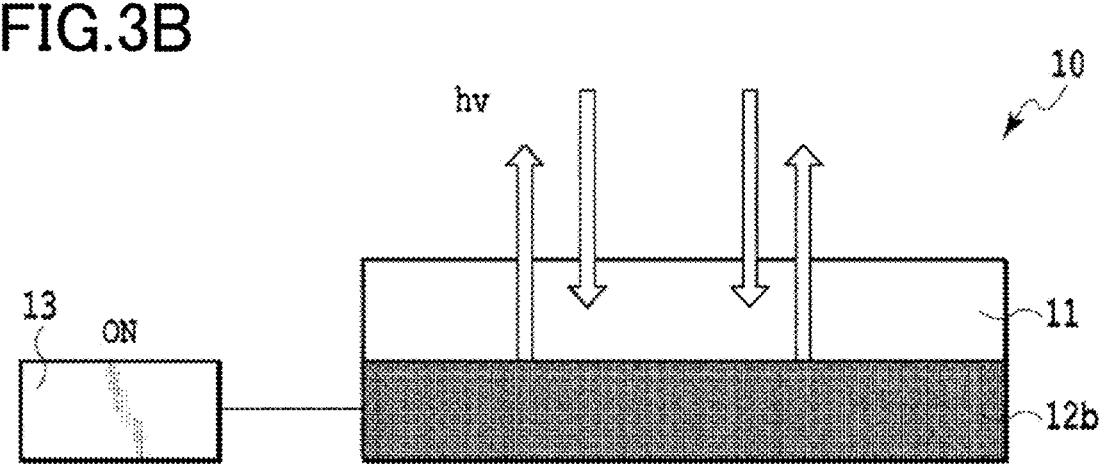
FIG. 3B is a schematic diagram illustrating the display medium 10 of the present invention when the chromic device is in a mirror state (12*b*).

When the display medium 10 that was obtained in this way was brought near an alternating-current magnetic field generator for supplying electrical power, and a +5 V voltage was applied to the chromic device 12, the entire chromic device 12 was set to a mirror state, and when light entered into the diffraction structure section 11, it was possible to observe diffracted light that included images of morning glory and gold fish as illustrated in FIG. 3A at a certain observation angle.

Moreover, when a −5 V voltage was applied to the chromic device 12, the entire chromic device 12 that was in a mirror state is set to a transparent state, and the diffracted light image is lost.

Example 2

As the supporting body for manufacturing, a 250 µm thick polyethylene terephthalate (PET) plate was used. One surface of this supporting body was coated with ink having the composition described below, and the ink was dried to form a 0.5 µm thick release layer.

[Release Layer Ink Composition]

| | |
|---|---|
| Polyamide imide resin | 19.5 parts by weight |
| Polyethylene powder | 0.5 parts by weight |
| Dimethylacetamide | 30.0 parts by weight |
| Toluene | 50.0 parts by weight |

Next, ink that includes the composition described below was coated and dried on the release layer using a gravure printing method, and after a 1.5 µm thick diffraction structure section was layered, a pre-fabricated relief plate for expressing a diffracted light pattern of a picture of a gold fish and morning glory (refer to FIG. 3A) was heated and pressed against the diffraction structure layer and an embossing process was performed to form a desired diffraction section 11 on the diffraction structure layer.

[Ink Composition of the Diffraction Structure Layer]

| | |
|---|---|
| Acrylic resin | 18.0 parts per weight |
| Silane coupling agent | 2.0 parts per weight |
| Methyl ethyl ketone | 80.0 parts per weight |

Next, a 100 nm thickness film of an alloy of magnesium and nickel was formed on the diffraction structure section 11 using a sputtering method, and the light controlling mirror layer of the chromic device 12 was layered.

Next, water-soluble masking ink having the composition described below was coated and dried on the portion that would become the electrode of the light controlling mirror layer using a gravure printing method to form a first mask printed layer having a thickness of 5 µm, after which the catalyst layer of the chromic device 12 was layered by forming a 100 nm thickness film of palladium using a sputtering method.

[Composition of the Water-Soluble Masking Ink]

| | |
|---|---|
| Water-soluble inorganic salt | 13.0 parts by weight |
| Hydrophilic inorganic filler | 2.0 parts by weight |
| Isopropyl alcohol | 10.0 parts by weight |
| Water | 75.0 parts by weight |

Next, the buffer layer of the chromic device 12 was layered by forming a 100 nm thickness film of aluminum using a sputtering method.

Next, the solid electrolyte layer of the chromic device 12 was layered by forming a 100 nm thickness film of tantalum oxide using a sputtering method.

The ion storage layer of a light control element complex 23 was then layered by forming a 100 nm thickness film of tungsten oxide using a sputtering method.

Next, the conductive film was layered by forming a 100 nm thickness film of ITO using a sputtering method. Then, a second mask printed layer having a thickness of 5 μm was formed on part of the conductive film layer that is different than the first mask printed layer by applying and drying a coat of ink having the same composition as the first mask printed layer on a portion that will become another electrode.

Next, a printed layer 55 having a thickness of 1 μm was formed by applying and drying a coat of printed layer ink having the composition described below in an arbitrary character, image, or picture pattern on the chromic device 12 using a gravure printing method.

[Composition of the Printed Layer Ink]

| Ink binder | 10.0 parts by weight |
| --- | --- |
| Pigment | 15.0 parts by weight |
| Methyl ethyl ketone | 35.0 parts by weight |
| Toluene | 40.0 parts by weight |

Next, a concealing layer 54 having a thickness of 2 μm was formed by applying and drying a coat of white concealing ink having the composition described below over the entire surface of the printed layer 55 and the chromic device 12 using a gravure printing method.

[Composition of the White Concealing Ink]

| Ink binder | 10.0 parts by weight |
| --- | --- |
| White pigment | 5.0 parts by weight |
| Titanium oxide | 20.0 parts by weight |
| Ethyl acetate | 65.0 parts by weight |

Next, an electrode was formed by removing the first mask layer and second mask layer by washing with water. The IC chip 22 was then connected to this electrode, and furthermore, an antenna 21 having a desired antenna shape was formed by using a screen printing method to apply and dry a coat of ink for a printed antenna having the composition described below so that the end section of the antenna 21 is connected with the IC chip 22.

[Composition of Ink for a Printed Antenna]

| Silver | 80.0 parts by weight |
| --- | --- |
| Diethylene glycol monoethyl ether acetate | 20.0 parts by weight |

Figure 16:
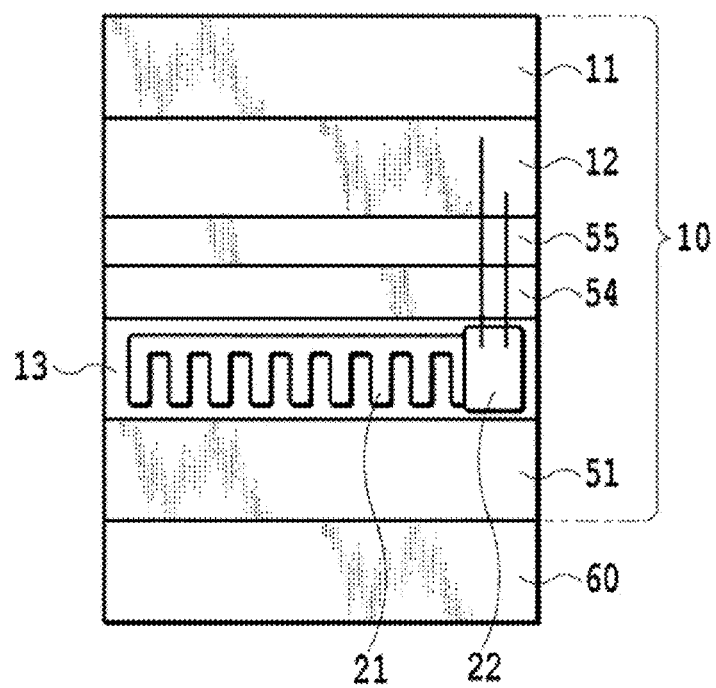
FIG. 16 illustrates the structure of the display medium 10 of Example 2.

Next, an adhesive layer 51 having a thickness of 5 μm was layered by using a gravure printing method to apply and dry a coat of adhesive layer ink having the composition described below so as to cover the entire surface of the concealing layer 54, antenna 21 and IC chip 22. Then, polyethylene was laminated to one surface of kraft paper (thickness of about 100 μm), and a silicon-treated separator was temporarily adhered to that adhesive layer. After that, the display medium 10 was made by peeling the separator away and affixing the laminated body to an article 60, and finally by peeling the laminated body away from the PET plate that is the supporting body for manufacturing (refer to FIG. 16).

[Composition of the Adhesive Layer Ink]

| Acrylic adhesive | 30.0 parts by weight |
| --- | --- |
| Ethyl acetate | 50.0 parts by weight |
| Toluene | 20.0 parts by weight |

When the display medium 10 that was obtained in this way was brought near an alternating-current magnetic field generator for supplying electrical power, and a +5 V voltage was applied to the chromic device, the entire chromic device 12 was set to a mirror state, and when light entered into the diffraction structure section 11, it was possible to observe diffracted light that included images of morning glory and gold fish as illustrated in FIG. 3A at a certain observation angle.

Moreover, when a −5 V voltage was applied to the light controlling mirror layer, the entire chromic device 12 that was in a mirror state is set to a transparent state, and even though the diffracted light image was lost, the antenna 21 and the IC chip 22 could not be visually observed due to the concealing layer 54, and it was possible to observe only the pattern and characters of the printed layer 55 located below the chromic device 12.

Example 3

In Examples 1 and 2, examples of a display medium having the diffraction structure section and chromic device of the present invention were given, however, in this example, the case is explained in which plural pattern displays are controlled by an external signal by using the property that the chromic device becomes transparent or a mirror by the display medium applying a voltage.

In this example, the chromic device has been patterned and includes at least one and preferably two or more patterns.

Here, FIG. 17 illustrates an example in which the chromic device has three patterns. In light control element pattern A the light control element is patterned into a sun pattern, in light control element pattern B the light control element is patterned into a moon pattern, and light control element pattern C the light control element is patterned into a heart pattern. The patterns above can be displayed in any arbitrary combination from one to three patterns.

These patterns are controlled by an external signal. A pattern of plural chromic devices 12 that has been patterned is selected (P1), and a pattern signal for that pattern is transmitted from the outside of the display medium 10 (P2). Next, an external signal receiver 31 of the display medium 10 receives that pattern signal and sends the signal to a processing chip 32 (P3), then the processing chip 32 processes the signal and controls the voltage that is applied to the chromic device 12 from the power supply 13 (P4), and the chromic device 12 is able to change the pattern state according to the voltage that is applied (P5) (refer to FIG. 7). Different images are displayed on the display medium 10 according to the pattern of the chromic device 12.

Examples are given below for the three pattern signals in FIG. 17.

TABLE 1

Examples of Pattern Signals and of State Changes
of the chromic device (Three Patterns A, B, C)

| Selected Signal | Light Control Element Pattern A | Light Control Element Pattern B | Light Control Element Pattern C |
|---|---|---|---|
| A | ○ | X | X |
| B | X | ○ | X |
| C | X | X | ○ |
| AB | ○ | ○ | X |
| AC | ○ | X | ○ |
| BC | X | ○ | ○ |
| ABC | ○ | ○ | ○ |

○: Mirror state (image can be seen)
X: Transparent state (image cannot be seen)

FIG. 18 illustrates examples of the pictures that are seen when the signals A to ABC are selected.

| | |
|---|---|
| (Signal A) | A face image can be seen in pattern A. |
| (Signal B) | A face image can be seen in pattern B. |
| (Signal C) | A face can be seen in pattern C. |
| (Signal AB) | A face image can be seen in patterns A and B. |
| (Signal AC) | A face image can be seen in patterns A and C. |
| (Signal BC) | A face image can be seen in patterns B and C. |
| (Signal ABC) | A face image can be seen in patterns A, B and C. |

In this way, the display medium of the present invention is able to arbitrarily change the display of recorded optical image information even when viewed from the same viewing point, and as a result, it is possible to arbitrarily change the image displayed.

REFERENCE SIGNS LIST

10 Display medium
11 Diffraction structure section
12 Chromic device
12a Chromic device in a transparent state
12b Chromic device in a mirror state
13 Power supply
14 External power source
21 Antenna
22 IC chip
31 External signal receiver
32 Processing chip
41 Top-layer electrode
42 Bottom-layer electrode
51 Adhesive layer
52 Supporting body
53 Cover member
54 Concealing layer
55 Printed layer
60 Article

What is claimed is:

1. A matrix-shaped display comprising
    (A) a top electrode comprising a plurality of first lines;
    (B) a bottom electrode, which is a transparent conductive film comprising a plurality of second lines, which are arranged in a direction different from that of the plurality of first lines;
    (C) a thin film light controllable mirror between the top electrode and the bottom electrode;
    (D) a transparent diffraction structure on the top electrode opposite to the thin film light controllable mirror, the diffraction structure comprises a recorded optical image, the first lines and the second lines define a plurality of matrix elements in the thin film light controllable mirror and a plurality of corresponding matrix elements in the transparent diffraction structure; and wherein applying voltage to said top electrode and the bottom electrode switches each matrix element of said plurality in the thin film light controllable mirror between a transparent state and a mirror state, wherein when a matrix element of said plurality in the thin film light controllable mirror is in the transparent state a portion of the recorded optical image in a corresponding matrix element of said plurality of the transparent diffraction structure is not visible when observed from a side of the transparent diffraction structure, which is opposite to the top electrode; and when a matrix element of said plurality in the thin film light controllable mirror is in the mirror state a portion of the recorded optical image in a corresponding matrix element of said plurality of the transparent diffraction structure is visible when observed from the side of the transparent diffraction structure, which is opposite to the top electrode.

2. The display medium of claim 1, further comprising a control element that is configured to individually switch each matrix element of said plurality in the thin film light controllable mirror between the transparent state and the mirror state.

3. The display medium of claim 2, further comprising a power supply connected to the control element.

4. The display medium of claim 2, wherein the recorded optical image comprises a plurality of individual images and wherein the control element is configured to display each individual image of said plurality while not displaying other individual images of said plurality by switching matrix elements of said plurality in the thin film light controllable mirror, which correspond to the individual image into the mirror state, and switching matrix elements of said plurality in the thin film light controllable mirror, which do not correspond to the individual image, into the transparent state.

5. A method of displaying an optical image, comprising applying a voltage to a top electrode and a bottom electrode of a matrix-shaped display comprising:
    (A) the top electrode comprising a plurality of first lines;
    (B) the bottom electrode, which is a transparent conductive film comprising a plurality of second lines, which are arranged in a direction different from that of the plurality of first lines;
    (C) a thin film light controllable mirror between the top electrode and the bottom electrode;
    (D) a transparent diffraction structure on the top electrode opposite to the thin film light controllable mirror, the diffraction structure comprises a recorded optical image, the first lines and the second lines define a plurality of matrix elements in the thin film light controllable mirror and a plurality of corresponding matrix elements in the transparent diffraction structure; and wherein said applying the voltage to said top electrode and the bottom electrode switches each matrix element of said plurality in the thin film light controllable mirror between a transparent state and a mirror state, wherein when a matrix element of said plurality in the thin film light controllable mirror is in the transparent state a portion of the recorded optical image in a corresponding matrix element of said plurality of the transparent diffraction structure is not visible when observed from a side of the transparent diffraction structure, which is opposite to the top electrode; and when a matrix element of said plurality in the thin film light controllable mirror is in the mirror state a portion of the recorded optical image in a corresponding matrix element of said plurality of the transparent diffraction structure is visible when observed from the side of the transparent diffraction structure, which is opposite to the top electrode.

6. The method of claim 5, further comprises individually switching each matrix element of said plurality in the thin film light controllable mirror between the transparent state and the mirror state by controlling a pattern of the voltage applied to the top electrode and bottom electrode.

7. The method of claim 6 further comprising receiving the pattern of the voltage from an external signal receiver.

8. The method of claim 5, wherein the recorded optical image comprises a plurality of individual images and the method further comprises displaying each individual image of said plurality while not displaying other individual images of said plurality by switching matrix elements of said plurality in the thin film light controllable mirror, which correspond to the individual image into the mirror state, and switching matrix elements of said plurality in the thin film light controllable mirror, which do not correspond to the individual image, into the transparent state.

* * * * *